US011249484B2

(12) United States Patent
Lim et al.

(10) Patent No.: US 11,249,484 B2
(45) Date of Patent: Feb. 15, 2022

(54) METHODS AND SYSTEMS FOR AUTONOMOUS VEHICLE MOTION DEVIATION

(71) Applicant: UATC, LLC, San Francisco, CA (US)

(72) Inventors: Edward Henry Lim, Pacifica, CA (US); Eric Michael Perko, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 149 days.

(21) Appl. No.: 16/654,469

(22) Filed: Oct. 16, 2019

(65) Prior Publication Data

US 2020/0401147 A1 Dec. 24, 2020

Related U.S. Application Data

(60) Provisional application No. 62/864,843, filed on Jun. 21, 2019.

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 1/0276* (2013.01); *G05D 2201/0213* (2013.01)

(58) Field of Classification Search
CPC .. G05D 1/0214; G05D 1/0088; G05D 1/0276; G05D 2201/0213; G08G 1/167; B60W 2555/60; B60W 2554/20; B60W 2554/4026; B60W 2554/4029; B60W 2554/4041; B60W 2520/10; B60W 30/18163; B60W 60/0015; B60W 60/0011

See application file for complete search history.

(56) References Cited

U.S. PATENT DOCUMENTS

| 9,457,807 | B2 | 10/2016 | Lee et al. |
| 2015/0210312 | A1* | 7/2015 | Stein ............... G06K 9/00805 701/41 |
| 2019/0137285 | A1* | 5/2019 | Bailey ............... G06F 16/29 |

OTHER PUBLICATIONS

Gu et al., "Human-like Planning of Swerve Maneuvers for Autonomous Vehicles", IEEE Intelligent Vehicles Symposium, Jun. 19-22, 2016, Gothenburg, Sweden, pp. 716-721.

(Continued)

*Primary Examiner* — Rodney A Butler
(74) *Attorney, Agent, or Firm* — Dority & Manning, P.A.

(57) ABSTRACT

The present disclosure is directed to deviating from a planned path for an autonomous vehicle. In particular, a computing system comprising one or more computing devices physically located onboard an autonomous vehicle can identify one or more boundaries at least in part defining a lane in which the autonomous vehicle is traveling along a path of a planned route. Responsive to identifying one or more obstructions ahead of the autonomous vehicle along the path, the computing system can: determine one or more deviations from the path that would result in the autonomous vehicle avoiding the obstruction(s) and at least partially crossing at least one of the one or more boundaries; and generate, based at least in part on the deviation(s), a motion plan instructing the autonomous vehicle to deviate from the path such that it avoids the obstruction(s) and continues traveling along the planned route.

19 Claims, 7 Drawing Sheets

(56) References Cited

OTHER PUBLICATIONS

Gu et al., "A Lightweight Simulator for Autonomous Driving Motion Planning Development", $4^{th}$ International Conference on Intelligent Systems and Applications, Oct. 11-16, 2015, St.Julians, Malta, pp. 94-97.
Gu et al., "Tunable and Stable Real-Time Trajectory Planning for Urban Autonomous Driving", IEEE/RSJ International Conference on Intelligent Robots and Systems, Sep. 28, 2015-Oct. 2, 2015, Hamburg, Germany, pp. 250-256.
McNaughton et al., "FAHR: Focused A* Heuristic Recomputation", International Conference on Intelligent Robots and Systems, Sep. 25-30, 2011, San Francisco, CA, pp. 4893-4898.
McNaughton, "Parallel Algorithms for Real-time Motion Planning", Carnegie Mellon University, PhD Thesis, 2011, 233 pages.

\* cited by examiner

METHODS AND SYSTEMS FOR AUTONOMOUS VEHICLE MOTION DEVIATION

PRIORITY CLAIM

This application claims priority to U.S. Patent Application Ser. No. 62/864,843, filed Jun. 21, 2019, and entitled "Methods and Systems for Motion Planning for an Autonomous Vehicle," the disclosure of which is incorporated by reference herein in its entirety.

FIELD

The present disclosure relates generally to autonomous vehicles. More particularly, the present disclosure relates to deviating from a planned path for an autonomous vehicle.

BACKGROUND

A vehicle can be used to provide transportation in one or more different contexts. An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include identifying, by a computing system comprising one or more computing devices physically located onboard an autonomous vehicle, one or more boundaries at least in part defining a lane in which the autonomous vehicle is traveling along a path of a planned route. The method can also include, responsive to identifying, by the computing system, one or more obstructions ahead of the autonomous vehicle along the path: determining, by the computing system, one or more deviations from the path that would result in the autonomous vehicle avoiding the obstruction(s) and at least partially crossing at least one of the one or more boundaries; and generating, by the computing system and based at least in part on the deviation(s), a motion plan instructing the autonomous vehicle to deviate from the path such that it avoids the obstruction(s), at least partially crosses the at least one of the one or more boundaries, and continues traveling along the planned route. Generating, by the computing system, the motion plan can include jointly generating, by the computing system, a location plan and a velocity plan for the autonomous vehicle. The method can include evaluating, by the computing system, one or more safety conditions that evaluate characteristics of the motion plan or an environment in which the autonomous vehicle is travelling. The method can include, when the one or more safety conditions are satisfied, causing, by the computing system, the autonomous vehicle to execute the motion plan.

Another example aspect of the present disclosure is directed to an autonomous vehicle. The autonomous vehicle can include one or more processors and a memory storing instructions that when executed by the processor(s) cause the autonomous vehicle to perform operations. The operations can include identifying one or more obstructions ahead of the autonomous vehicle along a path of a planned route. The operations can also include, responsive to identifying the obstruction(s): determining one or more deviations from the path that would result in the autonomous vehicle avoiding the obstruction(s) and at least partially crossing at least one of one or more boundaries defining a lane in which the autonomous vehicle is traveling along the path; and generating, based at least in part on the deviation(s), a motion plan instructing the autonomous vehicle to deviate from the path such that it avoids the obstruction(s), at least partially crosses the at least one of the one or more boundaries, and continues traveling along the planned route. The operations can also include, response to identifying the obstruction(s): evaluating one or more safety conditions that evaluate characteristics of the motion plan or an environment in which the autonomous vehicle is travelling. The operations can also include, response to identifying the obstruction(s), and when the one or more safety conditions are satisfied: executing the motion plan.

A further example aspect of the present disclosure is directed to one or more non-transitory computer-readable media comprising instructions that when executed by a computing system comprising one or more computing devices physically located onboard an autonomous vehicle cause the computing system to perform operations. The operations can include identifying one or more obstructions ahead of the autonomous vehicle. The operations can also include, responsive to identifying the obstruction(s), determining one or more deviations, from a planned path of the autonomous vehicle, that would result in the autonomous vehicle avoiding the obstruction(s) and at least partially crossing at least one of one or more boundaries defining a lane in which the autonomous vehicle is traveling along the planned path. The operations can also include, responsive to identifying the obstruction(s), evaluating one or more safety conditions that evaluate characteristics of the one or more deviations or an environment in which the autonomous vehicle is travelling; and, when the one or more safety conditions are satisfied, executing one of the one or more deviations.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
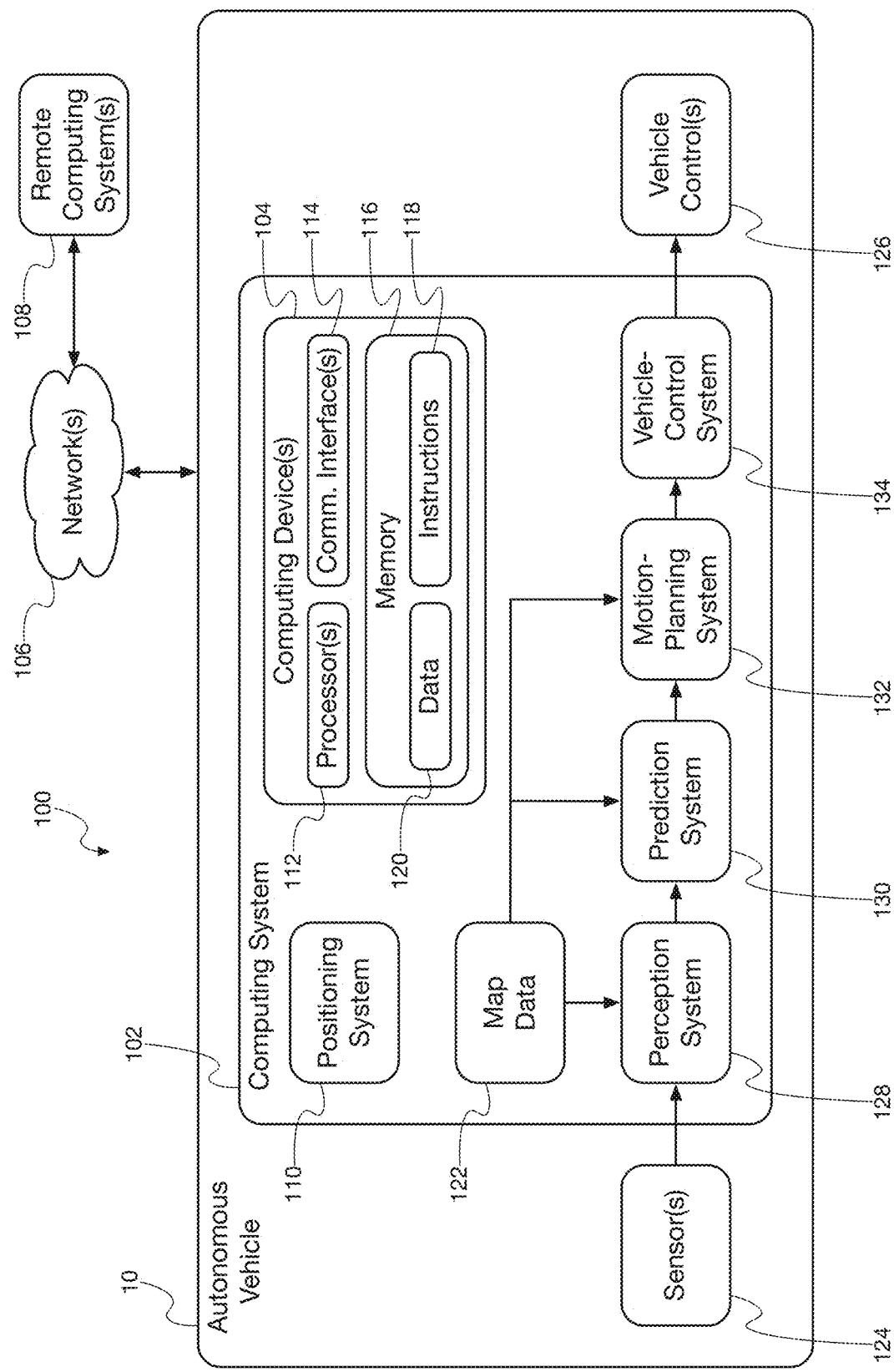
FIG. 1 depicts an example autonomous vehicle according to example embodiments of the present disclosure.

Example aspects of the present disclosure are directed to deviating from a planned path for an autonomous vehicle. For example, an autonomous vehicle can encounter an obstruction (e.g., a double-parked car, and/or the like) in its planned path that requires at least a portion of the vehicle to leave its current lane of travel in order to avoid the obstruction. The autonomous vehicle can be configured to generate and operate in accordance with motion plans, and such plans can be based at least in part on routes defined by geometries of the vehicle's current lane of travel. In accordance with aspects of the technology described herein, in response to identifying an obstruction, such geometries can be modified to permit the generation of motion plans that enable the vehicle to avoid the obstruction (e.g., by crossing into an adjacent lane, shoulder, and/or the like).

More particularly, one alternative approach to the proposed systems is to allow an autonomous vehicle to pass an obstacle in its path by only either fully transitioning into an adjacent same-direction lane or nudging within the current lane (e.g., deviating slighting from the center of the lane) but without allowing the autonomous vehicle to cross the lane boundary. Thus, in such an alternative approach, the autonomous vehicle is permitted only to fully change lanes or to attempt to pass the obstacle without exiting the lane at all. However, this alternative approach can result in an autonomous vehicle becoming intractably frozen in scenarios where there is no adjacent same-direction lane and there is insufficient room to nudge within the current lane. Thus, the autonomous vehicle is unable to continue towards the goal even when it may be appropriate and safe to at least partially exit the lane onto an adjacent space such as a shoulder, a turn lane, a bike lane, or an oncoming lane. When the autonomous vehicle becomes intractably stuck in such fashion, a human operator and/or a remote computing system may be required to assume manual and/or remote control of the vehicle to resolve the situation, which is an inefficient use of time and/or remote computing resources, provides a poor user experience, and represents a significant failure in the autonomous vehicle's capabilities.

According to aspects of the present disclosure, to resolve the issues associated with the alternative approaches described above, the present disclosure provides systems and methods that enable an autonomous vehicle to perform a "nudge" operation in which the autonomous vehicle is enabled to pass an obstacle by deviating from a center of a current lane—including at least partially exiting the current lane—but without fully transitioning into an adjacent area such as an adjacent same-direction lane, a shoulder, a turn lane, a bike lane, or an oncoming lane. Thus, aspects of the present disclosure enable more intelligent behavior from an autonomous vehicle, by, for example, providing motion planning systems that account for and permit minor and inconsequential "violations" of lane boundaries. Thus, the capabilities of an autonomous vehicle can be improved to reduce the number of failure events that the vehicle experiences.

In particular, responsive to identifying one or more obstructions ahead of an autonomous vehicle along a path of a planned route for the autonomous vehicle, a computing system including one or more computing devices physically located onboard the autonomous vehicle can determine one or more deviations from the path that would result in the autonomous vehicle avoiding the obstruction(s) and at least partially crossing at least one of one or more boundaries at least in part defining a lane in which the autonomous vehicle is traveling along the planned path. For example, the autonomous vehicle can identify and generate a motion plan that enables the autonomous vehicle to pass the obstacle and at least partially crossing at least one of one or more boundaries but without fully transitioning into an adjacent lane. Based at least in part on such deviation(s), the computing system can generate a motion plan instructing the autonomous vehicle to deviate from the planned path such that it avoids the obstruction(s), at least partially crosses the at least one of the one or more boundaries, and continues traveling along the planned route.

In some embodiments, the autonomous vehicle can determine that a nudge should or can be performed (e.g., rather than fully switching into an adjacent space) when the adjacent space is free of additional objects (e.g., other vehicles, bicyclists, etc.). In some embodiments, the autonomous vehicle can determine that a nudge should or can be performed (e.g., rather than fully switching into an adjacent space) when the adjacent space is not a same-direction lane (e.g., the adjacent space is a shoulder, a turn lane, a bike lane, an oncoming lane, and/or the like. In some embodiments, the autonomous vehicle can determine that a nudge should or can be performed (e.g., rather than fully switching into an adjacent space) when the autonomous vehicle plans to perform, within some threshold distance or time, a maneuver that requires presence of the autonomous vehicle in its current lane. As an example, assume an autonomous vehicle is in a right-hand lane and is planning to make a right-hand turn at an upcoming intersection that is 50 ft ahead of the autonomous vehicle's current location. The autonomous vehicle may decide to perform a nudge around an obstacle, for example, rather than fully transitioning into an adjacent left-hand same-direction lane. In such fashion, the autonomous vehicle can better account for and be in an improved position to perform its planned upcoming right-hand turn.

In some embodiments, as part of the autonomous vehicle's motion planning process, the computing system can determine a geometric planning problem associated with the autonomous vehicle traveling along the path (e.g., maintaining its current lane of travel, and/or the like). For example, determining the geometric planning problem can include identifying and/or establishing one or more geometries or geometrically defined locations and/or boundaries associated with vehicle travel. As one example, lane boundaries can be identified (e.g., by perceiving lane markings using sensors and/or consulting map data that provides lane boundary information). The geometric planning problem can include determining a motion plan for the autonomous vehicle based at least in part on such established geometries.

As one example, one or more constraints can be defined relative to the geometries. For example, the autonomous vehicle's motion planning system may be constrained to determine a motion plan that does not violate any boundary constraints (e.g., absent an explicit lane change, the system is constrained to produce only motion plans in which no portion of the vehicle crosses a lane boundary).

In some embodiments, the computing system can determine at least one boundary constraint of the geometric planning problem based at least in part on the deviation(s) (e.g., permitting generation of one or more motion plans allowing the vehicle to at least partially cross the one or more boundaries, and/or the like). For example, if the autonomous vehicle identifies a blocking obstacle, the autonomous vehicle can modify and/or disregard one or more existing constraints to enable the nudge behavior. As one example, a constraint that, absent an explicit lane change, typically prohibits any portion of the vehicle from crossing a lane boundary can be eliminated or disregarded. As another example, the constraint can be relaxed. For example, the constraint can be relaxed by modifying the constraint so that no more than a certain percentage (e.g., 30%) of the vehicle's footprint is allowed to cross the lane boundary and/or so that the vehicle is prohibited from crossing the lane boundary by more than a certain amount (e.g., nine inches). As another example, relaxing the constraint can include transforming the constraint from a hard constraint to a soft constraint within the motion planning process.

As another example, additionally or alternatively to the use of constraints, one or more cost functions can be defined which provide a cost value that is based on the geometries and/or the vehicle's relationship (e.g., location relative to) to the geometries. In particular, in some embodiments, a motion planning system associated with (e.g., included on-board) an autonomous vehicle can include an optimization planner that searches over a motion planning space to optimize a total cost associated with the motion plan of an autonomous vehicle. The total cost can be a sum of a number of different cost functions that evaluate different aspects of the motion plan and, optionally, a reward function that provides a reward (e.g., based on distance traveled by the motion plan). The motion plan that optimizes (e.g., locally optimizes) the total cost can be selected for implementation by the autonomous vehicle.

In some embodiments, in addition or alternatively to modifying constraints, the computing system can modify one or more cost functions that are applied by the motion planning system to enable the nudge behavior. As one example, a weight associated with a cost function that penalizes violation of the lane boundary can be reduced (e.g., to reduce its importance relative to other cost functions). As another example, the parameters of cost function can be modified to account for the limited lane boundary violation (e.g., a cost function that provides a penalty when the vehicle crosses a lane boundary can be modified to instead only provide the penalty when the vehicle crosses the lane boundary by more than a threshold amount (e.g., nine inches).

Thus, in some embodiments, the deviation(s) can result in only a limited portion of the autonomous vehicle crossing the at least one of the one or more boundaries. Alternatively, in some embodiments, the deviation(s) can result in the entirety of the autonomous vehicle crossing the at least one of the one or more boundaries.

In some embodiments, the at least one of the one or more boundaries can delineate the lane in which the autonomous vehicle is traveling from an adjacent shoulder of a travelway including the lane, an adjacent lane in which traffic travels in a common direction with traffic in the lane in which the autonomous vehicle is traveling, and/or an adjacent lane in which traffic travels in an opposing direction from traffic in the lane in which the autonomous vehicle is traveling.

In some embodiments, the identified obstruction(s) can include a stationary inanimate object in the lane (e.g., a cone or signal device associated with construction, and/or the like), a stationary vehicle in the lane (e.g., a double-parked car, and/or the like), a cyclist or pedestrian in the lane, and/or a travelway-surface condition of at least a portion of the lane (e.g., construction, a pot hole, loose gravel, ice, and/or the like). In some embodiments, if the obstruction(s) are classified or otherwise adjudged to be stationary, the autonomous vehicle can immediately perform or enable the nudge behavior. In some embodiments, if the obstruction(s) are classified or otherwise adjudged to be non-stationary, the autonomous vehicle may apply a waiting period before performing or enabling the nudge behavior, thereby providing an opportunity for the obstacle to either clear the path or make apparent that the autonomous vehicle should pass the obstacle. In some embodiments, the autonomous vehicle may apply a waiting period (e.g., even if the obstacle is stationary) if the obstacle is within some threshold distance from an intersection, crosswalk, or other location where an object may come to rest to enable such location to clear of pedestrians or similar. In such fashion, the autonomous vehicle may avoid attempting to pass a vehicle that is simply waiting for a crosswalk to clear.

In some embodiments, the computing system can determine (e.g., based at least in part on one or more perceptions determined from sensor data, and/or the like) a classification for at least one of the obstruction(s), for example, whether such obstruction(s) are associated with one or more vehicles, cyclists, pedestrians, travelway-surface conditions, and/or the like. In some embodiments, the autonomous vehicle may choose to perform or not perform the nudge behavior based on the classification of the obstruction. For example, it may be desirable to perform a nudge around a pedestrian that is stationary or moving quite slowly while it may be desirable to wait for a cyclist to determine if the cyclist will increase her speed prior to performing the nudge behavior.

In some embodiments, determining the deviation(s) can include the computing system determining the deviation(s) provide a minimum clearance distance between the autonomous vehicle and the obstruction(s). In some of such embodiments, the computing system can determine such minimum clearance distance based at least in part on a current speed of the autonomous vehicle. For example, it may be desirable to pass with a relatively larger minimum clearance distance when the autonomous vehicle is moving at a relatively faster speed. Additionally or alternatively, the computing system can determine the minimum clearance distance based at least in part on determined classification(s) for the obstruction(s). For example, it may be desirable to pass a pedestrian with a relatively larger minimum clearance distance than the minimum clearance distance for another vehicle.

In some embodiments, determining the deviation(s) can include the computing system determining the deviation(s) would not result in the autonomous vehicle crossing the at least one of the one or more boundaries by more than a threshold distance. In some of such embodiments, the computing system can determine such threshold distance based at least in part on determined classification(s) for the obstruction(s) and/or a classification associated with an adjacent space (e.g., adjacent lane) into which the autonomous vehicle is entering. As one example, the threshold distance may be relatively larger if the adjacent space is a same-direction lane, a turn lane, and/or a shoulder and may be relatively smaller if the adjacent space is an opposing direction lane. In such fashion, the level of danger associated with the adjacent space can be accounted for when determining how much the autonomous vehicle can cross the lane boundary. Likewise, the presence and/or types of objects (e.g., vehicles) in the adjacent space can be taken into account when determining the threshold distance. For example, a relatively larger distance may be permitted if a bicyclist is in the adjacent space while a relatively smaller distance may be used if a truck is in the adjacent space.

In some embodiments, determining the deviation(s) can include the computing system determining multiple different alternative deviations that would each result in the autonomous vehicle avoiding the obstruction(s) and at least partially crossing at least one of the one or more boundaries (e.g., deviating to the left or right, into the shoulder, an adjacent lane, and/or the like). In some of such embodiments, the computing system can select the deviation(s) from amongst the multiple different alternative deviations based at least in part on predetermined logic for selecting amongst available alternative deviations (e.g., a preference for deviating to the left or right in the current situation, at the current location of the autonomous vehicle, and/or the like). In some embodiments, the computing system can select the deviation(s) based at least in part on determined classification(s) for the obstruction(s). Additionally or alternatively, in some embodiments, for each deviation of the multiple different alternative deviations, the computing system can determine, in accordance with a predetermined cost function, a total cost associated with such deviation. In some of such embodiments, the computing system can select the deviation(s) based at least in part on one or more of their respective associated total cost(s) determined in accordance with the predetermined cost function.

In some embodiments, determining the deviation(s) can include the computing system determining at least one deviation that would result in the autonomous vehicle at least partially crossing at least one of the one or more boundaries such that one or more sensors of the autonomous vehicle can generate data representing a scene otherwise at least partially occluded by at least one of the obstruction(s) (e.g., "peeking" around such obstruction(s), and/or the like).

In some embodiments, the computing system can determine a location of the autonomous vehicle on the planned route, and the computing system can determine that the deviation(s) are permissible at the location. As one example, deviation(s) may not be permitted if there is a maneuver that is planned to be performed within some threshold distance (e.g., so the autonomous vehicle does not miss an on-ramp or similar). As another example, deviation(s) may not be permitted if the autonomous vehicle is located in a high pedestrian density zone. As another example, deviation(s) may not be permitted in certain restricted behavior zones such as airport pick up locations.

In some implementations, the computing system can evaluate one or more safety conditions that evaluate characteristics of a motion plan that includes one of the one or more deviation(s) and/or an environment in which the autonomous vehicle is travelling. Specifically, in some implementations, the computing system can facilitate execution of the motion plan (e.g., approve the motion plan for execution) only when some number (e.g., 1, 2, half, all) of the safety condition(s) are satisfied. If some number (e.g., 1, 2, half, all) of the safety condition(s) are not satisfied, then the computing system can cause the autonomous vehicle to execute an alternative motion plan that does not include the deviation(s). For example, the alternative motion plan can instruct the autonomous vehicle to remain within the one or more boundaries that at least in part define the lane in which the autonomous vehicle is travelling.

The safety condition(s) can be various different types of conditions. Generally, example safety conditions may require that certain conditions be met to ensure that is it safe to perform one of the deviation(s). The safety conditions can be logical checks that must be met before engaging in the nudge behavior.

As one example, one example condition can require an absence of actors in an adjacent lane in which traffic travels in an opposing direction from traffic in the lane in which the autonomous vehicle is traveling. Thus, if there are oncoming vehicles, then the deviation(s) may not be performed which require at least partial entry into the oncoming lane. As another example, another example condition can require an absence of actors in one or more driveways providing entry to a travelway including the lane. Thus, if there are vehicles or the like which may enter the travelway during performance of the deviation(s), then the computing system can decline to deviate from its current lane. As another example, another example condition can require an absence of pedestrians or bicyclists in the travelway including the lane. Thus, if there are relatively vulnerable and/or erratic actors within the travelway, then the computing system can decline to deviate from its current lane.

As another example, another example condition can require a minimum visibility distance in front of the autonomous vehicle. For example, the minimum visibility distance can be a function of or determined based on road curvature, topography, obstacles, weather, or combinations thereof. Thus, if the autonomous vehicle sensors cannot observe a sufficient distance in advance of the path of the autonomous vehicle, then the computing system can decline to cause the vehicle to perform the deviation(s). As another example, another example condition can require the motion plan to include complete re-entry of the autonomous vehicle into the lane within a threshold period of time following the autonomous vehicle at least partially crossing the at least one of the one or more boundaries. Thus, if the autonomous vehicle does not fully re-enter the lane within some threshold amount of time (e.g., 1, 2, or 3 seconds), then the computing system can decline to cause the vehicle to perform the deviation(s). As another example, another example condition can require the motion plan to include a minimum amount of signal time in which a turn signal of the autonomous vehicle can be operated prior to the autonomous vehicle at least partially crossing the at least one of the one or more boundaries. Thus, the condition can require that sufficient time is available to signal the intent of the autonomous vehicle to deviate from the lane. As another example, another example condition can require the motion plan to maintain the autonomous vehicle at greater than a minimum velocity throughout the motion plan. Thus, if the autonomous vehicle does not maintain a sufficient speed throughout the deviation(s), then the computing system can decline to cause the vehicle to perform the deviation(s).

Various means can be configured to perform the methods and processes described herein. For example, a computing system can include boundary-identification unit(s), obstruction-identification unit(s), deviation-determination unit(s), motion-plan-generation unit(s), and/or other means for performing the operations and functions described herein. In some embodiments, one or more of the units may be implemented separately. In some embodiments, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to identify the one or more boundaries, identify the obstruction(s), determine the deviation(s), generate the motion plan, and/or the like.

The technology described herein can provide a number of technical effects and benefits. For example, the technology described herein can reduce the amount of time, energy resources, and/or the like expended by an autonomous vehicle, by obviating the need to continuously generate motion plans associated with one or more obstructions in a planned path of the autonomous vehicle. Such efficiencies can also improve passenger experience by reducing overall wait times, promote overall safety by removing the vehicle from precarious situations, and/or the like.

With reference now to the figures, example embodiments of the present disclosure will be discussed in further detail.

FIG. 1 depicts an example autonomous vehicle according to example embodiments of the present disclosure.

Referring to FIG. 1, environment 100 can include autonomous vehicle 10, one or more networks 106, and one or more remotely located computing systems 108.

Autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, bike, scooter, light electric vehicle, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system(s) 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system(s) 108 can be distinct and/or remotely located from autonomous vehicle 10. Network(s) 106 (e.g., wired networks, wireless networks, and/or the like) can interface autonomous vehicle 10 (e.g., computing system 102, computing device(s) 104, and/or the like) with computing system(s) 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system(s) 108, by a combination of computing system(s) 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan. The motion plan can include both a location plan and a velocity plan for the autonomous vehicle. The location plan can describe a series of locations that the autonomous vehicle should achieve at various times. The velocity plan can provide a velocity at which the autonomous vehicle should be travelling at each location within the series of locations. Thus, the motion-planning system 132 can jointly and simultaneously generate the location plan and the velocity plan to include in the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

FIGS. 2A-D depict example scenes according to example embodiments of the present disclosure.

Figure 2A:
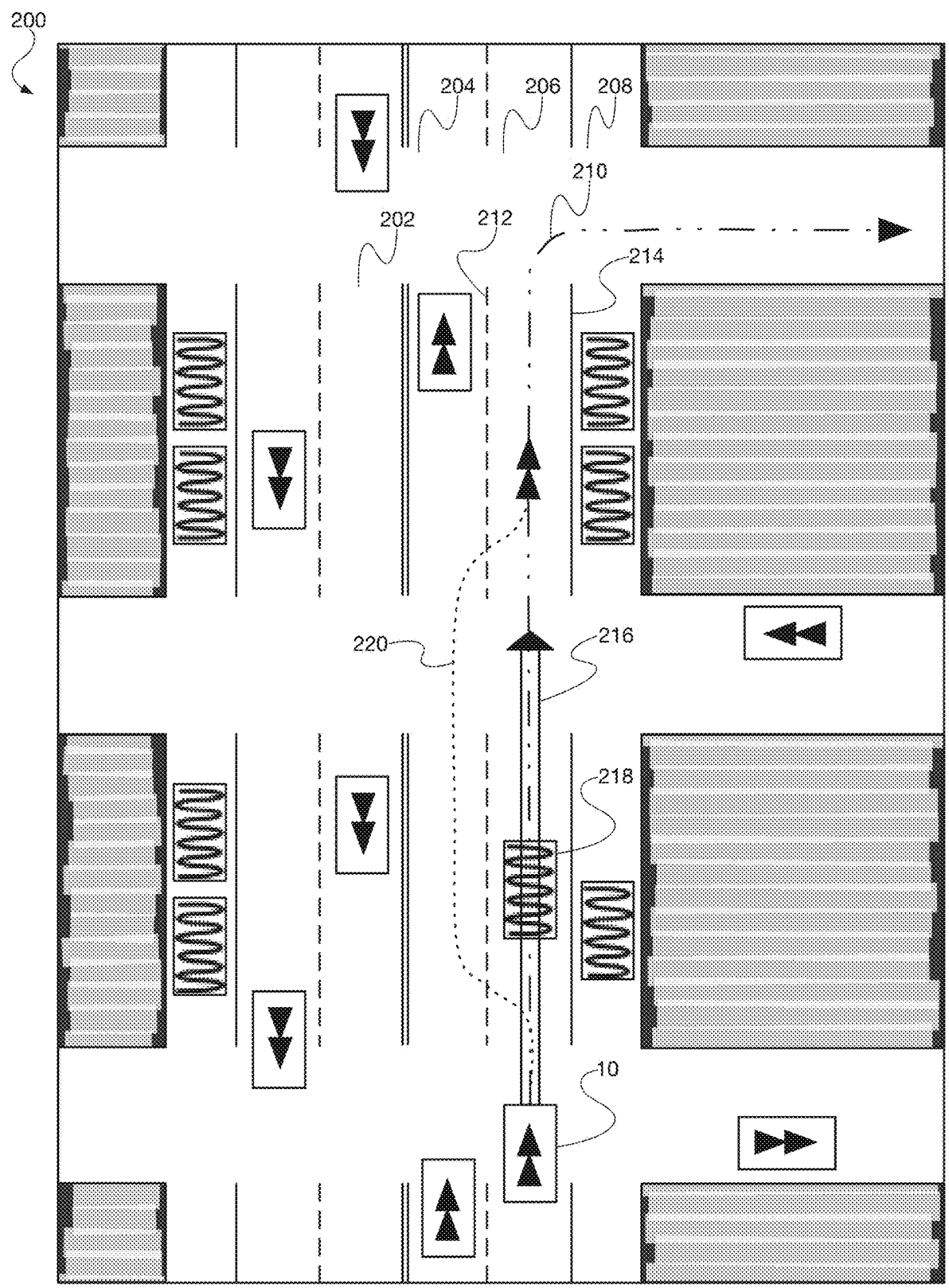
FIGS. 2A-D depict example scenes according to example embodiments of the present disclosure.

Referring to FIG. 2A, scene 200 can include a travelway including lanes 202, 204, and 206, as well as adjacent shoulder 208. Autonomous vehicle 10 can be traveling in lane 206, along path 216 of planned route 210. Boundary 212 (e.g., delineating lane 206 from lane 204, and/or the like) and/or boundary 214 (e.g., delineating lane 206 from shoulder 208, and/or the like) can at least in part define lane 206, and as autonomous vehicle 10 travels along path 216, computing system 102 can identify (e.g., based at least in part on data generated by sensor(s) 124, and/or the like) boundary 212 and/or boundary 214.

Obstruction 218 (e.g., a stationary vehicle, double-parked car, and/or the like) can be located along path 216, and as autonomous vehicle 10 travels along path 216, computing system 102 can identify (e.g., based at least in part on data generated by sensor(s) 124, and/or the like) obstruction 218. In some embodiments, computing system 102 can determine (e.g., based at least in part on one or more perceptions determined by perception system 128, based at least in part on data generated by sensor(s) 124, and/or the like) one or more classifications for obstruction 218 (e.g., that such obstruction is associated with a stationary vehicle, double-parked car, and/or the like).

In accordance with aspects of the disclosure, responsive to identifying obstruction 218, computing system 102 can determine one or more deviations from path 216 that would result in autonomous vehicle 10 avoiding obstruction 218. Such deviation(s) can result in autonomous vehicle 10 at least partially crossing at least one boundary defining lane 206 (e.g., boundary 212, and/or the like). In some embodiments, such boundary (e.g., boundary 212, and/or the like) can delineate lane 206 from an adjacent lane (e.g., lane 204, and/or the like) in which traffic travels in a common direction with traffic in lane 206. Additionally or alternatively, such deviation(s) can result in autonomous vehicle 10 at least partially crossing at least one boundary delineating a lane in which autonomous vehicle 10 is traveling (e.g., lane 204 (not illustrated), and/or the like) from an adjacent lane (e.g., lane 202, and/or the like) in which traffic travels in an opposing direction from traffic in the lane in which autonomous vehicle 10 is traveling, and/or the like. In some embodiments, the deviation(s) can result in the entirety of autonomous vehicle 10 crossing such boundary (e.g., boundary 212, and/or the like).

In some embodiments, computing system 102 can determine the deviation(s) would not result in autonomous vehicle 10 crossing boundary 212 by more than a threshold distance. In some of such embodiments, computing system 102 can determine such threshold distance based at least in part on the determined classification(s) for obstruction 218.

In some embodiments, computing system 102 can determine a location of autonomous vehicle 10 on planned route 210 (e.g., with respect to an intersection of the travelway with one or more other travelways, and/or the like), and computing system 102 can determine (e.g., based at least in part on the determined classification(s) for obstruction 218, and/or the like) that the deviation(s) are permissible at such location.

In some embodiments, computing system 102 can determine the deviation(s) provide a minimum clearance distance between autonomous vehicle 10 and obstruction 218. In some of such embodiments, computing system 102 can determine such minimum clearance distance based at least in part on a current speed of autonomous vehicle 10. Additionally or alternatively, computing system 102 can determine the minimum clearance distance based at least in part on the determined classification(s) for obstruction 218.

Based at least in part on the determined deviation(s), computing system 102 can generate a motion plan instructing autonomous vehicle 10 to deviate from path 216 such that it avoids obstruction 218, at least partially crosses boundary 212, and continues traveling along planned route 210. For example, computing system 102 can generate a motion plan configured to cause autonomous vehicle 10 to follow trajectory 220, and/or the like.

In some embodiments, computing system 102 can determine a geometric planning problem associated with autonomous vehicle 10 traveling along path 216 (e.g., maintaining its current lane of travel, and/or the like), and in some of such embodiments, computing system 102 can determine at least one boundary constraint of the geometric planning problem based at least in part on the determined deviation(s) (e.g., permitting generation of one or more motion plans allowing the vehicle to at least partially cross boundary 212, and/or the like).

Figure 2B:
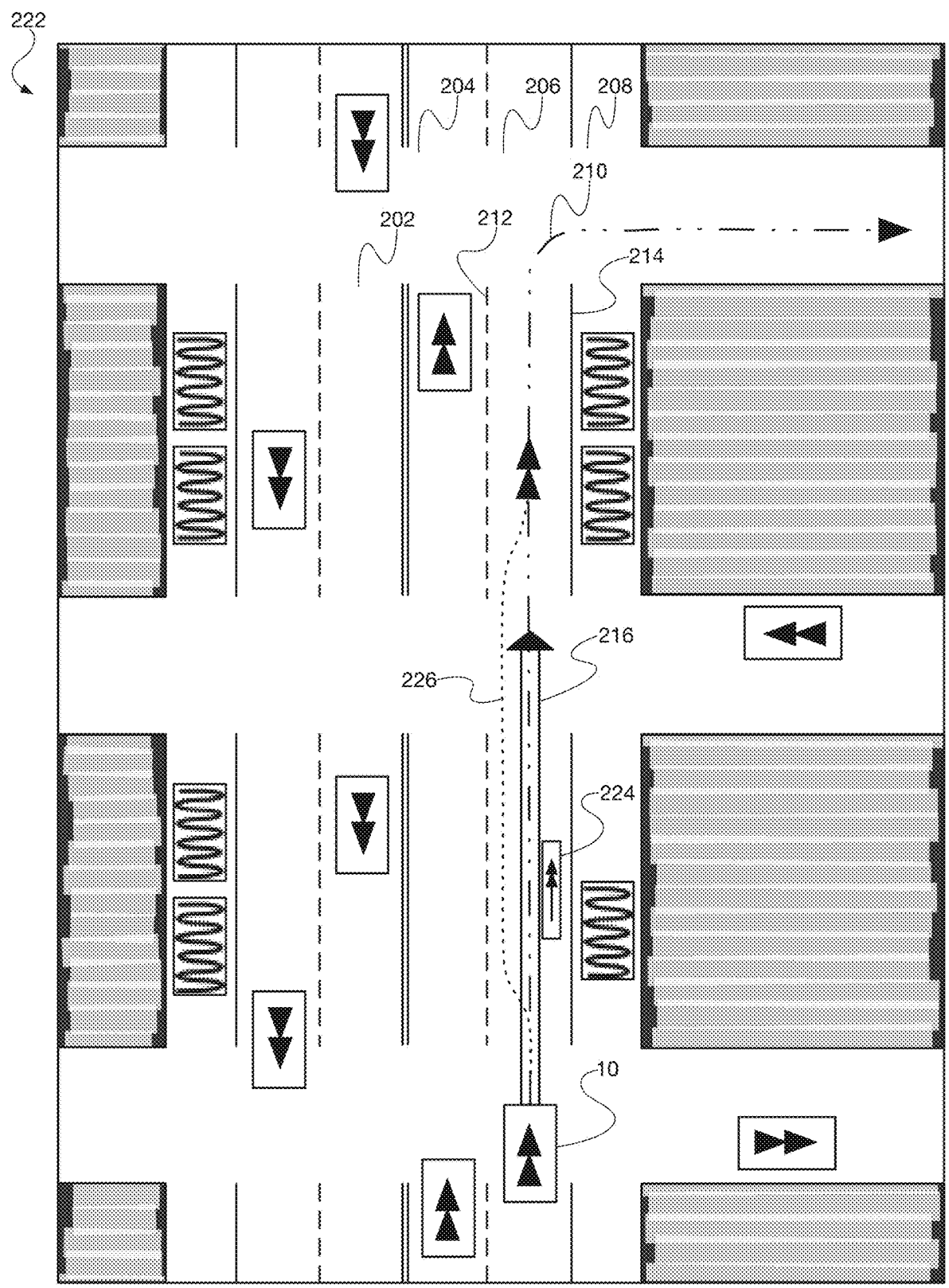

Referring to FIG. 2B, scene 222 can include the travelway including lanes 202, 204, and 206, as well as adjacent shoulder 208. As previously indicated, autonomous vehicle 10 can be traveling in lane 206, along path 216 of planned route 210. Boundary 212 (e.g., delineating lane 206 from lane 204, and/or the like) and/or boundary 214 (e.g., delineating lane 206 from shoulder 208, and/or the like) can at least in part define lane 206, and as autonomous vehicle 10 travels along path 216, computing system 102 can identify (e.g., based at least in part on data generated by sensor(s) 124, and/or the like) boundary 212 and/or boundary 214.

Obstruction 224 (e.g., a cyclist, pedestrian, and/or the like) can be located along path 216, and as autonomous vehicle 10 travels along path 216, computing system 102 can identify (e.g., based at least in part on data generated by sensor(s) 124, and/or the like) obstruction 224. In some embodiments, computing system 102 can determine (e.g., based at least in part on one or more perceptions determined by perception system 128, based at least in part on data generated by sensor(s) 124, and/or the like) one or more classifications for obstruction 224 (e.g., that such obstruction is associated with a cyclist, pedestrian, and/or the like).

In accordance with aspects of the disclosure, responsive to identifying obstruction 224, computing system 102 can determine one or more deviations from path 216 that would result in autonomous vehicle 10 avoiding obstruction 224. Such deviation(s) can result in autonomous vehicle 10 at least partially crossing at least one boundary defining lane 206 (e.g., boundary 212, and/or the like). In some embodiments, such boundary (e.g., boundary 212, and/or the like) can delineate lane 206 from an adjacent lane (e.g., lane 204, and/or the like) in which traffic travels in a common direction with traffic in lane 206. In some embodiments, the deviation(s) can result in only a limited portion of autonomous vehicle 10 crossing such boundary (e.g., boundary 212, and/or the like).

In some embodiments, computing system 102 can determine the deviation(s) would not result in autonomous vehicle 10 crossing boundary 212 by more than a threshold distance. In some of such embodiments, computing system 102 can determine such threshold distance based at least in part on the determined classification(s) for obstruction 224.

In some embodiments, computing system 102 can determine a location of autonomous vehicle 10 on planned route 210 (e.g., with respect to an intersection of the travelway with one or more other travelways, and/or the like), and computing system 102 can determine (e.g., based at least in part on the determined classification(s) for obstruction 224, and/or the like) that the deviation(s) are permissible at such location.

In some embodiments, computing system 102 can determine the deviation(s) provide a minimum clearance distance between autonomous vehicle 10 and obstruction 224. In some of such embodiments, computing system 102 can determine such minimum clearance distance based at least in part on a current speed of autonomous vehicle 10. Additionally or alternatively, computing system 102 can determine the minimum clearance distance based at least in part on the determined classification(s) for obstruction 224.

Based at least in part on the determined deviation(s), computing system 102 can generate a motion plan instructing autonomous vehicle 10 to deviate from path 216 such that it avoids obstruction 224, at least partially crosses boundary 212, and continues traveling along planned route 210. For example, computing system 102 can generate a motion plan configured to cause autonomous vehicle 10 to follow trajectory 226, and/or the like.

Figure 2C:
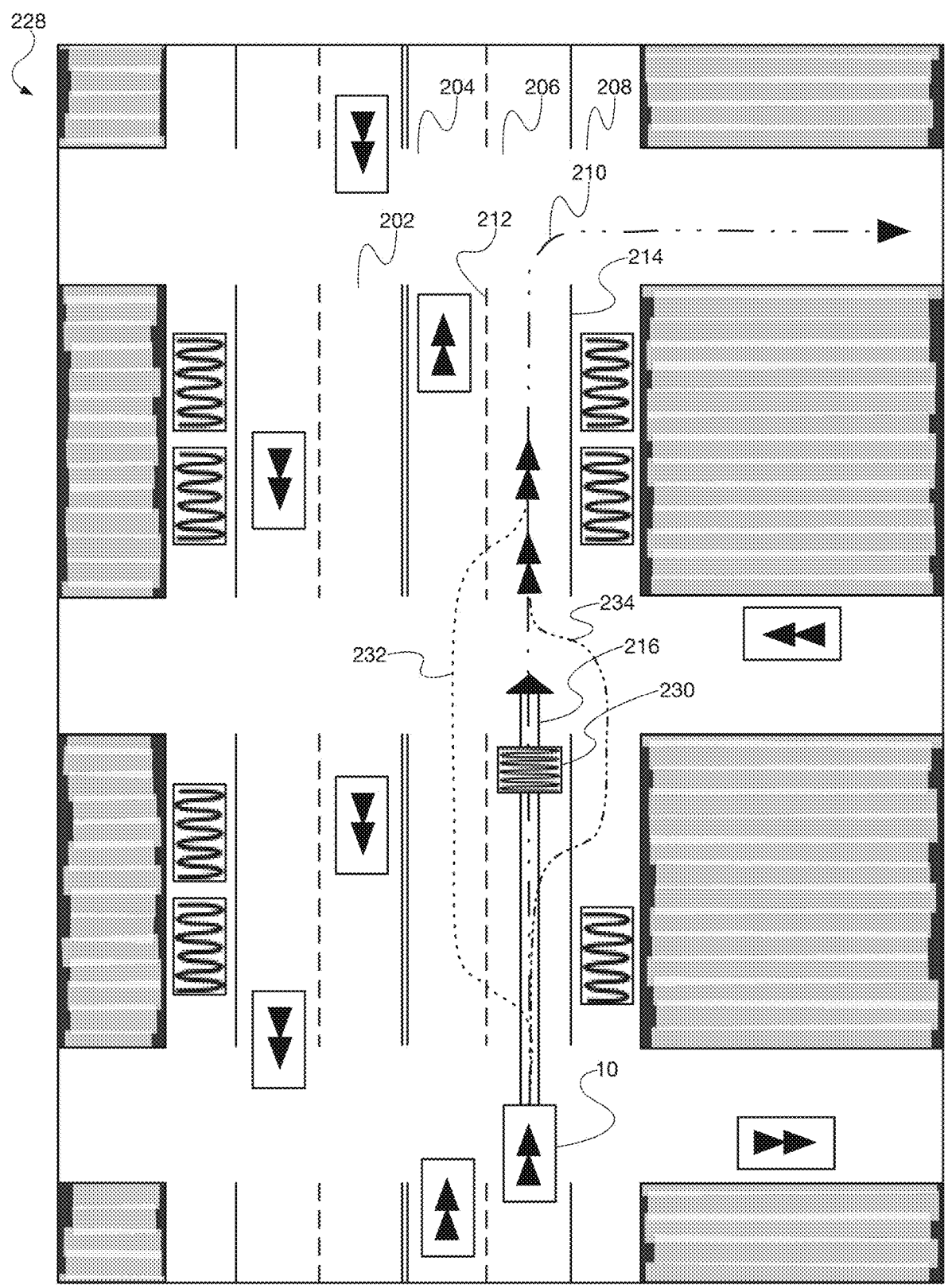

Referring to FIG. 2C, scene 228 can include the travelway including lanes 202, 204, and 206, as well as adjacent shoulder 208. As previously indicated, autonomous vehicle 10 can be traveling in lane 206, along path 216 of planned route 210. Boundary 212 (e.g., delineating lane 206 from lane 204, and/or the like) and/or boundary 214 (e.g., delineating lane 206 from shoulder 208, and/or the like) can at least in part define lane 206, and as autonomous vehicle 10 travels along path 216, computing system 102 can identify (e.g., based at least in part on data generated by sensor(s) 124, and/or the like) boundary 212 and/or boundary 214.

Obstruction 230 (e.g., a stationary inanimate object, cone or signal device associated with construction, travelway-surface condition, construction, pot hole, loose gravel, ice, and/or the like) can be located along path 216, and as autonomous vehicle 10 travels along path 216, computing system 102 can identify (e.g., based at least in part on data generated by sensor(s) 124, and/or the like) obstruction 230. In some embodiments, computing system 102 can determine (e.g., based at least in part on one or more perceptions determined by perception system 128, based at least in part on data generated by sensor(s) 124, and/or the like) one or more classifications for obstruction 230 (e.g., that such obstruction is associated with a stationary inanimate object, cone or signal device associated with construction, travelway-surface condition, construction, pot hole, loose gravel, ice, and/or the like).

In accordance with aspects of the disclosure, responsive to identifying obstruction 230, computing system 102 can determine one or more deviations from path 216 that would result in autonomous vehicle 10 avoiding obstruction 230. Such deviation(s) can result in autonomous vehicle 10 at least partially crossing at least one boundary defining lane 206 (e.g., boundary 212, 214, and/or the like). In some embodiments, such boundary (e.g., boundary 212, and/or the like) can delineate lane 206 from an adjacent lane (e.g., lane 204, and/or the like) in which traffic travels in a common direction with traffic in lane 206. Additionally or alternatively, such boundary (e.g., boundary 214, and/or the like) can delineate lane 206 from adjacent shoulder 208.

In some embodiments, computing system 102 can determine the deviation(s) would not result in autonomous vehicle 10 crossing boundary 212 and/or 214 by more than a threshold distance. In some of such embodiments, computing system 102 can determine such threshold distance based at least in part on the determined classification(s) for obstruction 230.

In some embodiments, computing system 102 can determine a location of autonomous vehicle 10 on planned route 210 (e.g., with respect to an intersection of the travelway with one or more other travelways, and/or the like), and computing system 102 can determine (e.g., based at least in part on the determined classification(s) for obstruction 230, and/or the like) that the deviation(s) are permissible at such location.

In some embodiments, computing system 102 can determine the deviation(s) provide a minimum clearance distance between autonomous vehicle 10 and obstruction 230. In some of such embodiments, computing system 102 can determine such minimum clearance distance based at least in part on a current speed of autonomous vehicle 10. Additionally or alternatively, computing system 102 can determine the minimum clearance distance based at least in part on the determined classification(s) for obstruction 230.

In some embodiments, computing system 102 can determine multiple different alternative deviations that would each result in autonomous vehicle 10 avoiding obstruction 230 and at least partially crossing boundary 212 and/or 214. For example, a determined deviation could result in autonomous vehicle 10 shifting left into lane 204 (e.g., generation of a motion plan configured to cause autonomous vehicle 10 to follow trajectory 232, and/or the like), while a different determined deviation could result in autonomous vehicle 10 shifting right into shoulder 208 (e.g., generation of a motion plan configured to cause autonomous vehicle 10 to follow trajectory 234, and/or the like). In some of such embodiments, computing system 102 can select the deviation(s) from amongst the multiple different alternative deviations based at least in part on predetermined logic for selecting amongst available alternative deviations (e.g., a preference for deviating to the left or right in the current situation, at the current location of autonomous vehicle 10, and/or the like). In some embodiments, computing system 102 can select the deviation(s) based at least in part on the determined classification(s) for obstruction 230. Additionally or alternatively, in some embodiments, for each deviation of the multiple different alternative deviations, computing system 102 can determine, in accordance with a predetermined cost function, a total cost associated with such deviation. In some of such embodiments, computing system 102 can select the deviation(s) based at least in part on one or more of their respective associated total cost(s) determined in accordance with the predetermined cost function.

Based at least in part on the determined deviation(s), computing system 102 can generate a motion plan instructing autonomous vehicle 10 to deviate from path 216 such that it avoids obstruction 230, at least partially crosses boundary 212 and/or 214, and continues traveling along planned route 210. For example, computing system 102 can generate a motion plan configured to cause autonomous vehicle 10 to follow trajectory 232, 234, and/or the like.

Figure 2D:
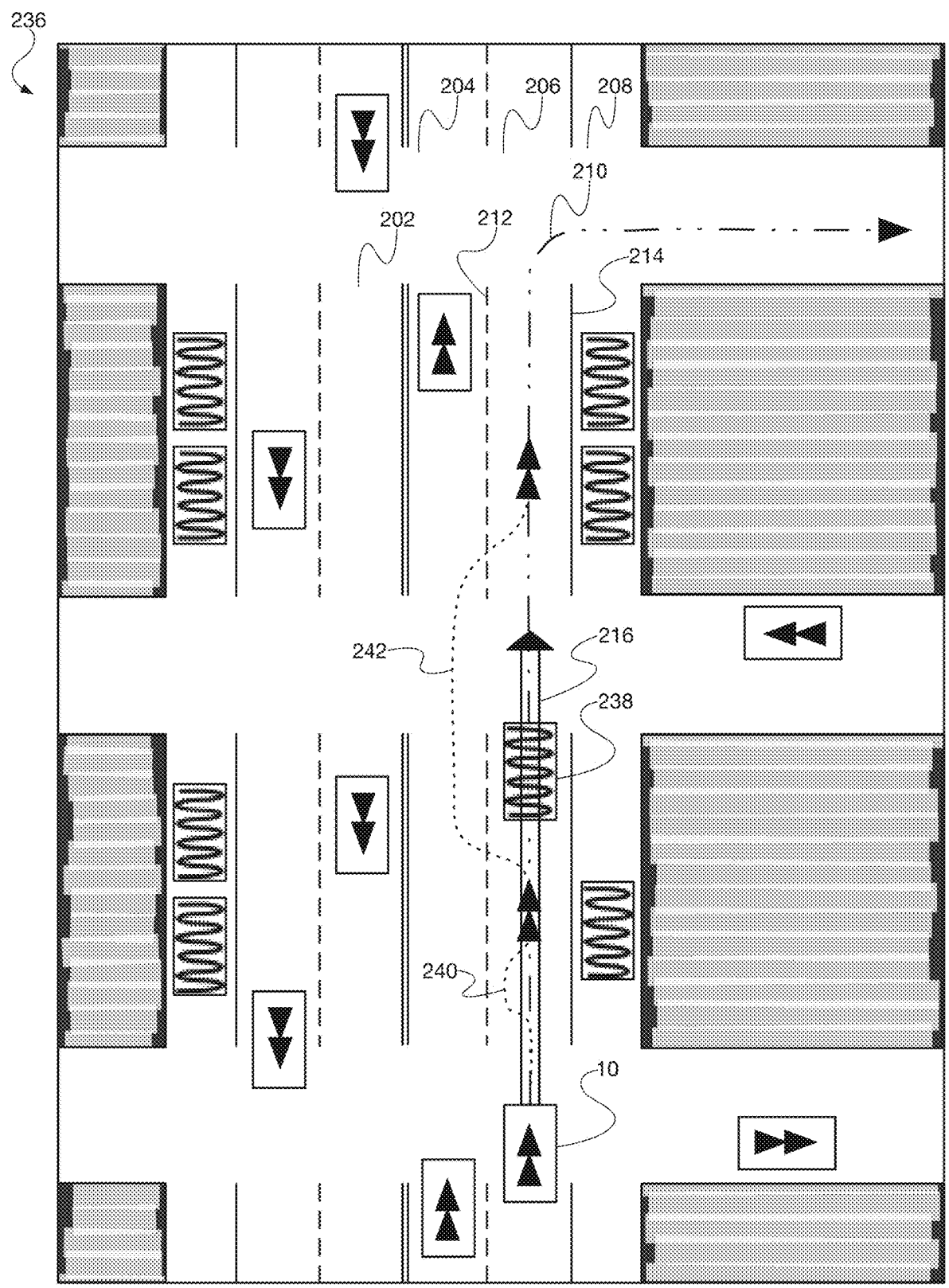

Referring to FIG. 2D, scene 236 can include the travelway including lanes 202, 204, and 206, as well as adjacent shoulder 208. As previously indicated, autonomous vehicle 10 can be traveling in lane 206, along path 216 of planned route 210. Boundary 212 (e.g., delineating lane 206 from lane 204, and/or the like) and/or boundary 214 (e.g., delineating lane 206 from shoulder 208, and/or the like) can at least in part define lane 206, and as autonomous vehicle 10 travels along path 216, computing system 102 can identify (e.g., based at least in part on data generated by sensor(s) 124, and/or the like) boundary 212 and/or boundary 214.

Obstruction 238 (e.g., a stationary vehicle, double-parked car, and/or the like) can be located along path 216, and as autonomous vehicle 10 travels along path 216, computing system 102 can identify (e.g., based at least in part on data generated by sensor(s) 124, and/or the like) obstruction 238. In some embodiments, computing system 102 can determine (e.g., based at least in part on one or more perceptions determined by perception system 128, based at least in part on data generated by sensor(s) 124, and/or the like) one or more classifications for obstruction 238 (e.g., that such obstruction is associated with a stationary vehicle, double-parked car, and/or the like).

In accordance with aspects of the disclosure, responsive to identifying obstruction 238, computing system 102 can determine one or more deviations from path 216 that would result in autonomous vehicle 10 avoiding obstruction 238. Such deviation(s) can result in autonomous vehicle 10 at least partially crossing at least one boundary defining lane 206 (e.g., boundary 212, and/or the like).

In some embodiments, computing system 102 can determine the deviation(s) would not result in autonomous vehicle 10 crossing boundary 212 by more than a threshold distance. In some of such embodiments, computing system 102 can determine such threshold distance based at least in part on the determined classification(s) for obstruction 238.

In some embodiments, computing system 102 can determine a location of autonomous vehicle 10 on planned route 210 (e.g., with respect to an intersection of the travelway with one or more other travelways, and/or the like), and computing system 102 can determine (e.g., based at least in part on the determined classification(s) for obstruction 238, and/or the like) that the deviation(s) are permissible at such location.

In some embodiments, computing system 102 can determine the deviation(s) provide a minimum clearance distance between autonomous vehicle 10 and obstruction 238. In some of such embodiments, computing system 102 can determine such minimum clearance distance based at least in part on a current speed of autonomous vehicle 10. Additionally or alternatively, computing system 102 can determine the minimum clearance distance based at least in part on the determined classification(s) for obstruction 238.

In some embodiments, computing system 102 can determine at least one deviation that would result in autonomous vehicle 10 at least partially crossing boundary 212 (e.g., generating a motion plan configured to cause autonomous vehicle 10 to follow trajectory 240, and/or the like) such that one or more of sensor(s) 124 can generate data representing a scene otherwise at least partially occluded by obstruction 238 (e.g., "peeking" around such obstruction, and/or the like).

Based at least in part on the determined deviation(s), computing system 102 can generate a motion plan instructing autonomous vehicle 10 to deviate from path 216 such that it avoids obstruction 238, at least partially crosses boundary 212, and continues traveling along planned route 210. For example, computing system 102 can generate a motion plan configured to cause autonomous vehicle 10 to follow trajectory 240, 242, and/or the like.

Figure 3:
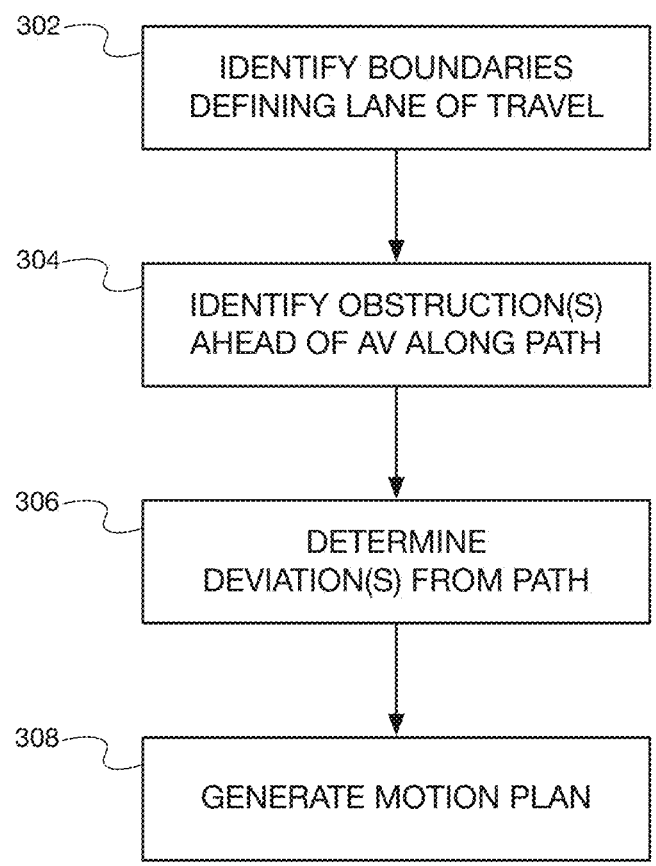
FIG. 3 depicts an example method according to example embodiments of the present disclosure.

FIG. 3 depicts an example method according to example embodiments of the present disclosure.

Referring to FIG. 3, at (302), a computing system comprising one or more computing devices physically located onboard an autonomous vehicle can identify one or more boundaries at least in part defining a lane in which the autonomous vehicle is traveling along a path of a planned route. For example, computing system 102 can identify boundary 212 and/or 214.

At (304), the computing system can identify one or more obstructions ahead of the autonomous vehicle along the path. For example, computing system 102 can identify obstruction 218, 224, 230, and/or 238.

At (306), the computing system can determine one or more deviations from the path that would result in the autonomous vehicle avoiding the obstruction(s) and at least partially crossing at least one of the one or more boundaries. For example, computing system 102 can determine one or more deviations from path 216 that would result in autonomous vehicle 10 avoiding obstruction 218, 224, 230, and/or 238 and at least partially crossing boundary 212 and/or 214.

At (308), the computing system can generate, based at least in part on the deviation(s), a motion plan instructing the autonomous vehicle to deviate from the path such that it avoids the obstruction(s), at least partially crosses the at least one of the one or more boundaries, and continues traveling along the planned route. For example, computing system 102 can generate a motion plan configured to cause autonomous vehicle 10 to follow trajectory 220, 226, 232, 234, 240, 242, and/or the like.

In some implementations, following (308) the computing system can evaluate one or more safety conditions that evaluate characteristics of a motion plan that includes one of the one or more deviation(s) and/or an environment in which the autonomous vehicle is travelling. Specifically, in some implementations, the computing system can facilitate execution of the motion plan generated at (308) (e.g., approve the motion plan for execution) only when some number (e.g., 1, 2, half, all) of the safety condition(s) are satisfied.

However, if some number (e.g., 1, 2, half, all) of the safety condition(s) are not satisfied, then the computing system can cause the autonomous vehicle to execute an alternative motion plan that does not include the deviation(s). For example, the alternative motion plan can instruct the autonomous vehicle to remain within the one or more boundaries that at least in part define the lane in which the autonomous vehicle is travelling. For example, the alternative motion plan can be generated without relaxing any constraints, without changing cost functions, and/or the like.

The safety condition(s) can be various different types of conditions. Generally, example safety conditions may require that certain conditions be met to ensure that is it safe to perform one of the deviation(s). The safety conditions can be logical checks that must be met before engaging in the nudge behavior.

As one example, one example condition can require an absence of actors in an adjacent lane in which traffic travels in an opposing direction from traffic in the lane in which the autonomous vehicle is traveling. Thus, if there are oncoming vehicles, then the deviation(s) may not be performed which require at least partial entry into the oncoming lane. As another example, another example condition can require an absence of actors in one or more driveways providing entry to a travelway including the lane. Thus, if there are vehicles or the like which may enter the travelway during performance of the deviation(s), then the computing system can decline to deviate from its current lane. As another example, another example condition can require an absence of pedestrians or bicyclists in the travelway including the lane. Thus, if there are relatively vulnerable and/or erratic actors within the travelway, then the computing system can decline to deviate from its current lane.

As another example, another example condition can require a minimum visibility distance in front of the autonomous vehicle. For example, the minimum visibility distance can be a function of or determined based on road curvature, topography, obstacles, weather, or combinations thereof. Thus, if the autonomous vehicle sensors cannot observe a sufficient distance in advance of the path of the autonomous vehicle, then the computing system can decline to cause the vehicle to perform the deviation(s). As another example, another example condition can require the motion plan to include complete re-entry of the autonomous vehicle into the lane within a threshold period of time following the autonomous vehicle at least partially crossing the at least one of the one or more boundaries. Thus, if the autonomous vehicle does not fully re-enter the lane within some threshold amount of time (e.g., 1, 2, or 3 seconds), then the computing system can decline to cause the vehicle to perform the deviation(s). As another example, another example condition can require the motion plan to include a minimum amount of signal time in which a turn signal of the autonomous vehicle can be operated prior to the autonomous vehicle at least partially crossing the at least one of the one or more boundaries. Thus, the condition can require that sufficient time is available to signal the intent of the autonomous vehicle to deviate from the lane. As another example, another example condition can require the motion plan to maintain the autonomous vehicle at greater than a minimum velocity throughout the motion plan. Thus, if the autonomous vehicle does not maintain a sufficient speed throughout the deviation(s), then the computing system can decline to cause the vehicle to perform the deviation(s).

Figure 4:
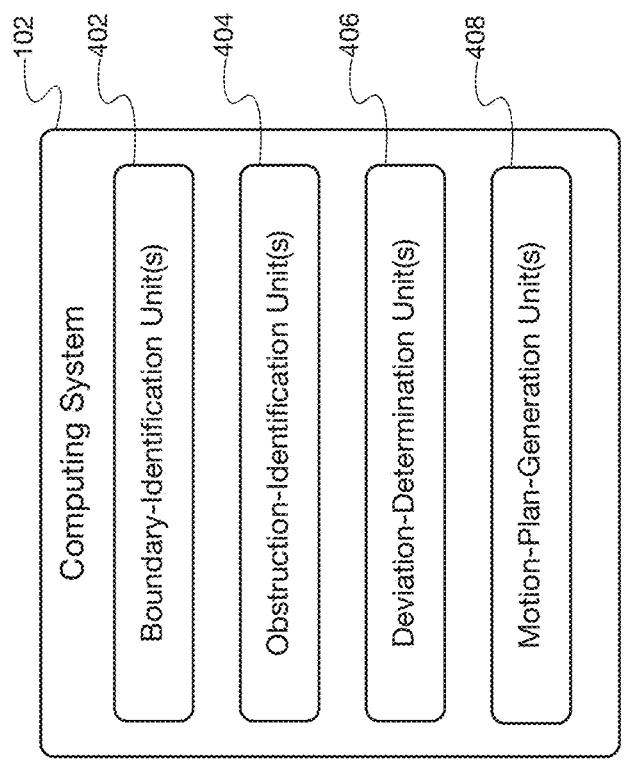
FIG. 4 depicts an example computing system according to example embodiments of the present disclosure.

FIG. 4 depicts an example computing system according to example embodiments of the present disclosure.

Referring to FIG. 4, various means can be configured to perform the methods and processes described herein. For example, computing system 102 can include boundary-identification unit(s) 402, obstruction-identification unit(s) 404, deviation-determination units 406, motion-plan-generation unit(s) 408, and/or other means for performing the operations and functions described herein. In some embodiments, one or more of the units can be implemented separately. In some embodiments, one or more units can be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to identify one or more boundaries at least in part defining a lane in which the autonomous vehicle is traveling, identify one or more obstructions ahead of the autonomous vehicle, determine one or more deviations from the path along which the autonomous vehicle is traveling, generate a motion plan instructing the autonomous vehicle to deviate from such path, and/or the like.

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for autonomous vehicle control, the method comprising:
   identifying, by a computing system comprising one or more computing devices, one or more boundaries defining a current lane in which an autonomous vehicle is traveling along a path of a planned route; and
   responsive to identifying, by the computing system, one or more obstructions ahead of the autonomous vehicle along the path:
   determining, by the computing system, one or more deviations from the path that would result in the autonomous vehicle avoiding the one or more obstructions by partially crossing at least one of the one or more boundaries;

generating, by the computing system based at least in part on the one or more deviations, a motion plan comprising a location plan and a velocity plan for the autonomous vehicle, the motion plan instructing the autonomous vehicle to deviate from the path to avoid the one or more obstructions by partially crossing the at least one of the one or more boundaries and continuing to travel along the planned route in the current lane of travel subsequent to passing the one or more obstructions;

determining, by the computing system, whether one or more safety conditions that evaluate characteristics of the motion plan or an environment in which the autonomous vehicle is travelling are satisfied; and responsive to determining that the one or more safety conditions are satisfied, causing, by the computing system, the autonomous vehicle to execute the motion plan to avoid the one or more obstructions.

2. The computer-implemented method of claim 1, comprising:

responsive to determining that the one or more safety conditions are not satisfied, causing, by the computing system, the autonomous vehicle to execute an alternative motion plan instructing the autonomous vehicle to remain within the one or more boundaries at least in part defining the current lane in which the autonomous vehicle is travelling.

3. The computer-implemented method of claim 1, wherein the one or more safety conditions require one or more of:

an absence of actors in an adjacent lane in which traffic travels in an opposing direction from traffic in the current lane in which the autonomous vehicle is traveling;

an absence of actors in one or more driveways providing entry to a travelway including the current lane;

a minimum visibility distance in front of the autonomous vehicle;

the motion plan to include complete re-entry of the autonomous vehicle into the current lane within a threshold period of time following the autonomous vehicle at least partially crossing the at least one of the one or more boundaries;

an absence of pedestrians or bicyclists in the travelway including the current lane;

the motion plan to include a minimum amount of signal time in which a turn signal of the autonomous vehicle can be operated prior to the autonomous vehicle partially crossing the at least one of the one or more boundaries; and the motion plan to maintain the autonomous vehicle at greater than a minimum velocity throughout the motion plan.

4. The computer-implemented method of claim 1, wherein the one or more deviations would result in only a limited portion of the autonomous vehicle crossing the at least one of the one or more boundaries.

5. The computer-implemented method of claim 1, wherein the at least one of the one or more boundaries delineates the current lane in which the autonomous vehicle is traveling from:

an adjacent shoulder of a travelway including the current lane;

an adjacent lane in which traffic travels in a common direction with traffic in the current lane in which the autonomous vehicle is traveling; or an adjacent lane in which traffic travels in an opposing direction from traffic in the current lane in which the autonomous vehicle is traveling.

6. The computer-implemented method of claim 1, wherein determining the one or more deviations comprises determining the one or more deviations provide a minimum clearance distance between the autonomous vehicle and the one or more obstructions.

7. The computer-implemented method of claim 6, comprising determining, by the computing system and based at least in part on a current speed of the autonomous vehicle, the minimum clearance distance between the autonomous vehicle and the one or more obstructions.

8. The computer-implemented method of claim 6, comprising:

determining, by the computing system, a classification for at least one of the one or more obstructions; and determining, by the computing system and based at least in part on the classification, the minimum clearance distance between the autonomous vehicle and the one or more obstructions.

9. The computer-implemented method of claim 1, wherein determining the one or more deviations comprises:

determining a plurality of different alternative deviations that would each result in the autonomous vehicle avoiding the one or more obstructions and partially crossing at least one of the one or more boundaries; and selecting, from amongst the plurality of different alternative deviations and based at least in part on predetermined logic for selecting amongst available alternative deviations, the one or more deviations.

10. The computer-implemented method of claim 9, wherein:

the method comprises determining, by the computing system, a classification for at least one of the one or more obstructions; and selecting the one or more deviations comprises selecting the one or more deviations based at least in part on the classification.

11. The computer-implemented method of claim 9, wherein:

the method comprises, for each deviation of the plurality of different alternative deviations, determining, by the computing system and in accordance with a predetermined cost function, a total cost associated with the deviation; and selecting the one or more deviations comprises selecting the one or more deviations based at least in part on one or more of their respective associated total costs determined in accordance with the predetermined cost function.

12. The computer-implemented method of claim 1, wherein determining the one or more deviations comprises determining the one or more deviations would not result in the autonomous vehicle crossing the at least one of the one or more boundaries by more than a threshold distance.

13. The computer-implemented method of claim 12, comprising:

determining, by the computing system, a classification for at least one of the one or more obstructions; and determining, by the computing system and based at least in part on the classification, the threshold distance.

14. The computer-implemented method of claim 1, wherein determining the one or more deviations comprises determining at least one deviation that would result in the autonomous vehicle partially crossing the at least one of the one or more boundaries such that one or more sensors of the autonomous vehicle can generate data representing a scene otherwise at least partially occluded by at least one of the one or more obstructions.

15. The computer-implemented method of claim 1, wherein the one or more obstructions comprise one or more of:
 a stationary inanimate object in the current lane;
 a stationary vehicle in the current lane;
 a cyclist in the current lane;
 a pedestrian in the current lane; or
 a travelway-surface condition of at least a portion of the current lane.

16. The computer-implemented method of claim 1, comprising:
 determining, by the computing system, a geometric planning problem associated with the autonomous vehicle traveling along the path; and
 determining, by the computing system and based at least in part on the one or more deviations, at least one boundary constraint of the geometric planning problem.

17. The computer-implemented method of claim 1, comprising:
 determining, by the computing system, a location of the autonomous vehicle on the planned route; and
 determining, by the computing system and based at least in part on one or more preconfigured rules, that the one or more deviations are permissible at the location.

18. An autonomous vehicle comprising:
 one or more processors; and
 a memory storing instructions that when executed by the one or more processors cause the autonomous vehicle to perform operations comprising:
  identifying one or more obstructions ahead of the autonomous vehicle along a path of a planned route; and
  responsive to identifying the one or more obstructions:
   determining one or more deviations from the path that would result in the autonomous vehicle avoiding the one or more obstructions by partially crossing at least one of one or more boundaries defining a lane in which the autonomous vehicle is traveling along the path;
   generating, based at least in part on the one or more deviations, a motion plan instructing the autonomous vehicle to deviate from the path such that it avoids the one or more obstructions by partially crossing the at least one of the one or more boundaries and continuing to travel along the planned route in the current lane of travel subsequent to passing the one or more obstructions;
   evaluating one or more safety conditions that evaluate characteristics of the motion plan or an environment in which the autonomous vehicle is travelling; and
   when the one or more safety conditions are satisfied, executing the motion plan.

19. One or more non-transitory computer-readable media comprising instructions that when executed by a computing system comprising one or more computing devices physically located onboard an autonomous vehicle cause the computing system to perform operations comprising:
 identifying one or more obstructions ahead of the autonomous vehicle; and
 responsive to identifying the one or more obstructions:
  determining one or more deviations, from a planned path of the autonomous vehicle, that would result in the autonomous vehicle avoiding the one or more obstructions by partially crossing at least one of one or more boundaries defining a current lane in which the autonomous vehicle is traveling along the planned path and continuing to travel along the planned path in the current lane subsequent to passing the one or more obstructions;
  evaluating one or more safety conditions that evaluate characteristics of the one or more deviations or an environment in which the autonomous vehicle is travelling; and
  when the one or more safety conditions are satisfied, executing one of the one or more deviations.

\* \* \* \* \*

UNITED STATES PATENT AND TRADEMARK OFFICE
CERTIFICATE OF CORRECTION

| | | |
|---|---|---|
| PATENT NO. | : 11,249,484 B2 | Page 1 of 1 |
| APPLICATION NO. | : 16/654469 | |
| DATED | : February 15, 2022 | |
| INVENTOR(S) | : Lim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this
Twenty-ninth Day of November, 2022

Katherine Kelly Vidal
*Director of the United States Patent and Trademark Office*